United States Patent
Berenbach et al.

(10) Patent No.: US 7,480,893 B2
(45) Date of Patent: Jan. 20, 2009

(54) RULE-BASED SYSTEM AND METHOD FOR CHECKING COMPLIANCE OF ARCHITECTURAL ANALYSIS AND DESIGN MODELS

(75) Inventors: Brian Berenbach, Edison, NJ (US); Jean Hartmann, Robbinsville, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 1064 days.

(21) Appl. No.: 10/677,406

(22) Filed: Oct. 2, 2003

(65) Prior Publication Data

US 2005/0076328 A1    Apr. 7, 2005

(51) Int. Cl.
  *G06F 9/44* (2006.01)
(52) U.S. Cl. ............ 717/104; 717/105; 717/120; 717/121; 717/122; 717/123
(58) Field of Classification Search .......... 717/104–123
  See application file for complete search history.

(56) References Cited

U.S. PATENT DOCUMENTS

| | | | | |
|---|---|---|---|---|
| 7,370,315 | B1* | 5/2008 | Lovell et al. ................ | 717/100 |
| 2002/0104068 | A1* | 8/2002 | Barrett et al. ............... | 717/104 |
| 2002/0170048 | A1* | 11/2002 | Zgarba et al. .............. | 717/168 |
| 2003/0018945 | A1* | 1/2003 | Foster et al. ................... | 716/5 |
| 2005/0005261 | A1* | 1/2005 | Severin ...................... | 717/108 |
| 2005/0015743 | A1* | 1/2005 | O'Brien ....................... | 717/104 |

OTHER PUBLICATIONS

Johan Galle: "HOORA: A Method for Hierarchical Object-Oriented Requirements Analysis Satisfying ESA's Needs" Journal of Object-Oriented Programming, 'Online! vol. 9, No. 3, Jun. 16, 1996, pp. Gent, Belgium Retrieved from the Internet: URL: http//www.hoora.org/Download/DoDownLoad.asp?typ=doc&file=HooraPaper.pdf.> 'retrieved on Jun. 2, 2004! p. 39, left-hand column, line 29 p. 39, right-hand column, line 36-p. 42, right-hand column, line 16 p. 43, left-hand column, ;ine 16-p. 44, right-hand column, line 33.
Gebhard B. et al: "Requirements Management for Automotive Systems Development" Societe of Automotive Engineers, Inc., Mar. 6, 2000, pp. 1-5, XP002182919 Munich, Germany p. 1, right-hand column, paragraph 2, p. 4, left-hand column, line 9-right-hand column, line 35 figures 5,6.
Selic B et al: "Room: an object-oriented methodology for developing real-time systems" Computer-Aided Software Engineering, 1995. Proceedings., Fifth International Workshop on Montreal, Que., Canada Jul. 6-10, 1992, Los Alamitos, CA, USA, IEE Comput. Soc, US, Jul. 6, 1992, pp. 230-240, XP010030414 ISBN: 0-8186-2960-6 abstract p. 236, left-hand column, line 6—p. 237, paragraph 5.4.

* cited by examiner

*Primary Examiner*—William H Wood
(74) *Attorney, Agent, or Firm*—Donald B. Paschburg; F. Chau & Associates, LLC

(57) ABSTRACT

A method for extracting requirements of an architectural software model comprises providing a use case model as a directed graph of the architectural software model comprising nodes corresponding to use cases and relations between nodes, and creating, automatically, a tree comprising a root node corresponding to an abstract use case and at least one leaf node corresponding to one of an abstract use case and a concrete use case.

16 Claims, 15 Drawing Sheets

Design Advisor Metrics

Metric

- ☑ Added Methods
- ☑ Artifact Description
- ☑ Class methods
- ☑ Class Reuse
- ☑ Class Variables
- ☑ Fan In Complexity
- ☑ Fan Out Complexity
- ☑ Friend functions
- ☑ Inherited Methods
- ☑ Instance Variables
- ☑ Key Classes
- ☑ Method complexity
- ☑ Multiple Inheritance
- ☑ Number of public instance methods
- ☑ Overridden methods
- ☑ Scenarios per subsystem
- ☑ Scenarios per Use case
- ☑ Specialization index

Status
Active

Description
This metric flags classes that inherit an excessive number of methods.

Reference
Lorenz, Mark "Object-oriented software metri

Threshold
Minimum: -1
Maximum: -1

Use -1 to inactivate a threshold

Save    Cancel

FIGURE 4B

Design Model Rules

- Circular Class Associations
- Class Inheritance Depth too great
- Class missing methods
- Dangling Class
- Design Pattern Violation
- Diagram too cluttered
- Empty Package
- Excessive Class Coupling
- Interface Not Used
- Missing Association Multiplicity
- Missing class reference
- Missing Interface(s)
- Name Collision
- Package has too many elements Severity: High Status: Active Description: An Actor is shown communicating with a Use Case, but an interface has not been defined to handle the communication. Every Actor-Use Case relation MUST have one or more associated interfaces.

Reference:

FIGURE 6

RULE-BASED SYSTEM AND METHOD FOR CHECKING COMPLIANCE OF ARCHITECTURAL ANALYSIS AND DESIGN MODELS

BACKGROUND OF THE INVENTION

1. Field of the Invention

The present invention relates to software design, and more particularly to a system and method for checking the compliance of architectural analysis and design models.

2. Discussion of Related Art

Increasing numbers of software architects, designers and developers are using object-oriented analysis and design modeling techniques and tools to describe and document software systems. In the case of the Unified Modeling Language (UML), these stakeholders can create models and communicate them to others with the help of a common notation. Rational Rose is an example of a modeling tool that uses UML models to provide visual representations of the software. Such models integrate design and implementation environments. However, as software systems grow in the complexity and size, these models are becoming equally complex.

FIG. 1 is a graph of project stages, including analysis, design, and implementation.

A successful analysis effort is important to the success of most software projects as the detailed system requirements are extracted from the analysis model. When using a model such as UML, an analysis model is first created and a design model is derived from the analysis model.

Enforcing modeling rules and constraints can tighten the analysis process, improving analysis sessions by keeping the analysts and subject matter experts focused. Moreover, by using a rigorous process, it is easier to derive a design model upon completion of the analysis effort. However, as analysis models become large on real-world projects, they can have many fine grain details that need to be translated into software. It is typical on large projects to have well over a thousand tasks that need to be identified and assigned during software development. A risk is that the product feature will not get implemented if one of the tasks is not transitioned from analysis to design to implementation.

For a software project, the "implementation model" is the full suite of software needed to implement the design.

Design modeling focuses on architectural and software issues. During design the target language and environment need to be known. Because of the iterative nature of object oriented software development, discoveries made during design modeling may impact the analysis model. Unless the entire software development process is controlled rigorously, traceability between the analysis and design model can start to break down. Changes made to the design also need to be reflected back into the analysis model. Failure to keep the analysis and design models consistent and synchronized will result in a loss of ability to perform risk analysis and effectively manage changes to requirements, as well as an inability to keep the project test plan up to date.

Accordingly, there is a need for a system and method for checking the compliance of such analysis and design models to reduce the overall design, development, and testing costs.

SUMMARY OF THE INVENTION

According to an embodiment of the present invention, a method for extracting requirements of an architectural software model comprises providing a use case model as a directed graph of the architectural software model comprising nodes corresponding to use cases and relations between nodes, and creating, automatically, a tree comprising a root node corresponding to an abstract use case and at least one leaf node corresponding to one of an abstract use case and a concrete use case.

The method comprises importing the tree directly into a requirements tool.

Creating the tree comprises creating one of a feature and a sub-feature of the tree upon determining an abstract use case of the use case model, and creating a requirement of the tree upon determining a concrete use case of the use case model.

Creating the tree comprises traversing the directed graph beginning with a root use case of the directed graph, and creating one of an included relationship, a derived relationship, and an extended relationship use case node corresponding a next use case of the directed graph. The root use case does not inherit or extend and is not included by another use case. The method further comprises deleting relationships between nodes until each node has one and only one parent. The method comprises deleting the extended relationship upon determining that the next node has relationships to two predecessors, wherein a first relationship is derived, a second relationship is extended, deleting the included relationship upon determining that the next node has relationships to two predecessors, wherein the first relationship is derived, the second relationship is included, and deleting the extended relation upon determining that the next node has relationships to two predecessors, wherein the first relationship is included, the second relationship is extended. The method comprises deleting a relationship to a node of a lower level upon determining that the next node has two predecessor relationships of the same type, deleting a relationship where a predecessor node is in a different package then a child node upon determining that the next node has two predecessor relationships of the same type, and deleting a relationship where the predecessor node is in a lower level package upon determining that the next node has two predecessor relationships of the same type. The method comprises deleting a later encountered relationship upon determining the next node has two predecessor relationships with the same criteria.

The method comprises detecting a cycle in the directed graph. The method further comprises requesting an elimination of the cycle before proceeding with requirements extraction.

According to an embodiment of the present invention, a method for semiautomated conversion of an analysis model to a design model comprises creating a mirror of the analysis model as the design model, reproducing a diagram of the analysis graph in the design model, wherein a design name adornment is added to the diagram in the design model, determining artifacts in the analysis model, recreating the artifacts in the design model using software conformant naming, and creating hyperlinks between the design model and the analysis model.

The method further comprises performing an automated analysis model and design model verification comprising performing a cross-model check. The method comprises performing an automated analysis model and design model verification comprising determining instances of a class in a sequence diagram, wherein an unused class violates the verification.

The method comprises performing an automated analysis model and design model verification comprising determining instances of a class in a collaboration diagram, wherein an unused class violates the verification.

According to an embodiment of the present invention a program storage device is provided readable by machine, tangibly embodying a program of instructions executable by the machine to perform method steps for extracting requirements of an architectural software model. The method steps comprises providing a use case model as a directed graph of the architectural software model comprising nodes corresponding to use cases and relations between nodes, and creating, automatically, a tree comprising a root node corresponding to an abstract use case and at least one leaf node corresponding to one of an abstract use case and a concrete use case.

BRIEF DESCRIPTION OF THE DRAWINGS

Preferred embodiments of the present invention will be described below in more detail, with reference to the accompanying drawings:

FIG. 4B is an illustration of a system for metrics collection according to an embodiment of the present invention;

FIG. 6 is an illustration of a system for editing rules according to an embodiment of the present invention;

DETAILED DESCRIPTION OF PREFERRED EMBODIMENTS

According to an embodiment of the present invention, a method for checking the compliance of architectural analysis and design models comprises creating a draft project plan, tracking the status of design artifacts, reporting on the completeness of modeling efforts, and reconciling the design against the status of implementation. The analysis and design models are used for describing and documenting software systems. The system and method can be applied to any type of object-oriented model, for example, a model defined using the Unified Modeling Language (UML). Further, the system and method enable the conversion of an existing analysis model to a design model.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
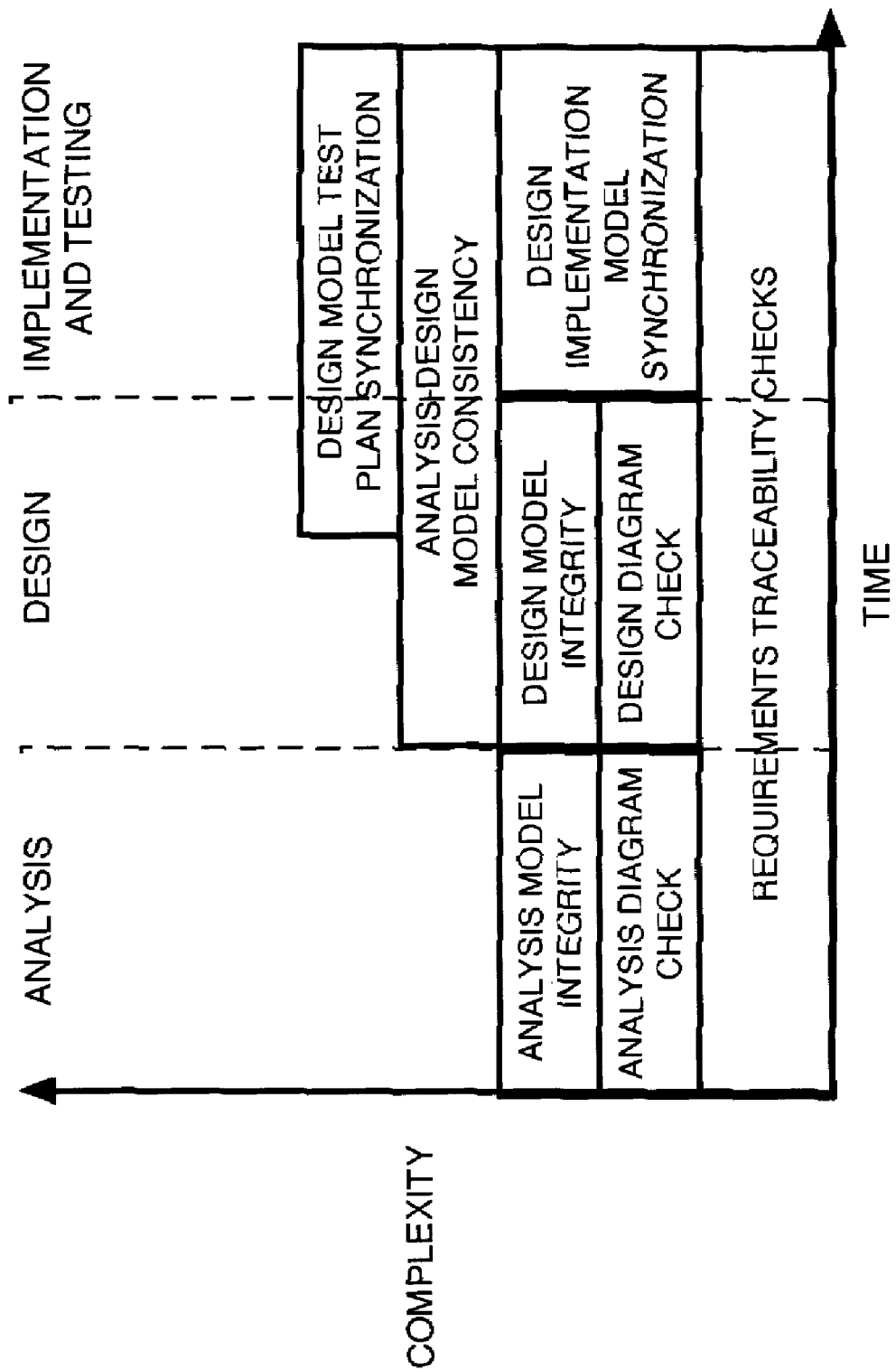
FIG. 1 is a graph of a project timeline.
Figure 2:
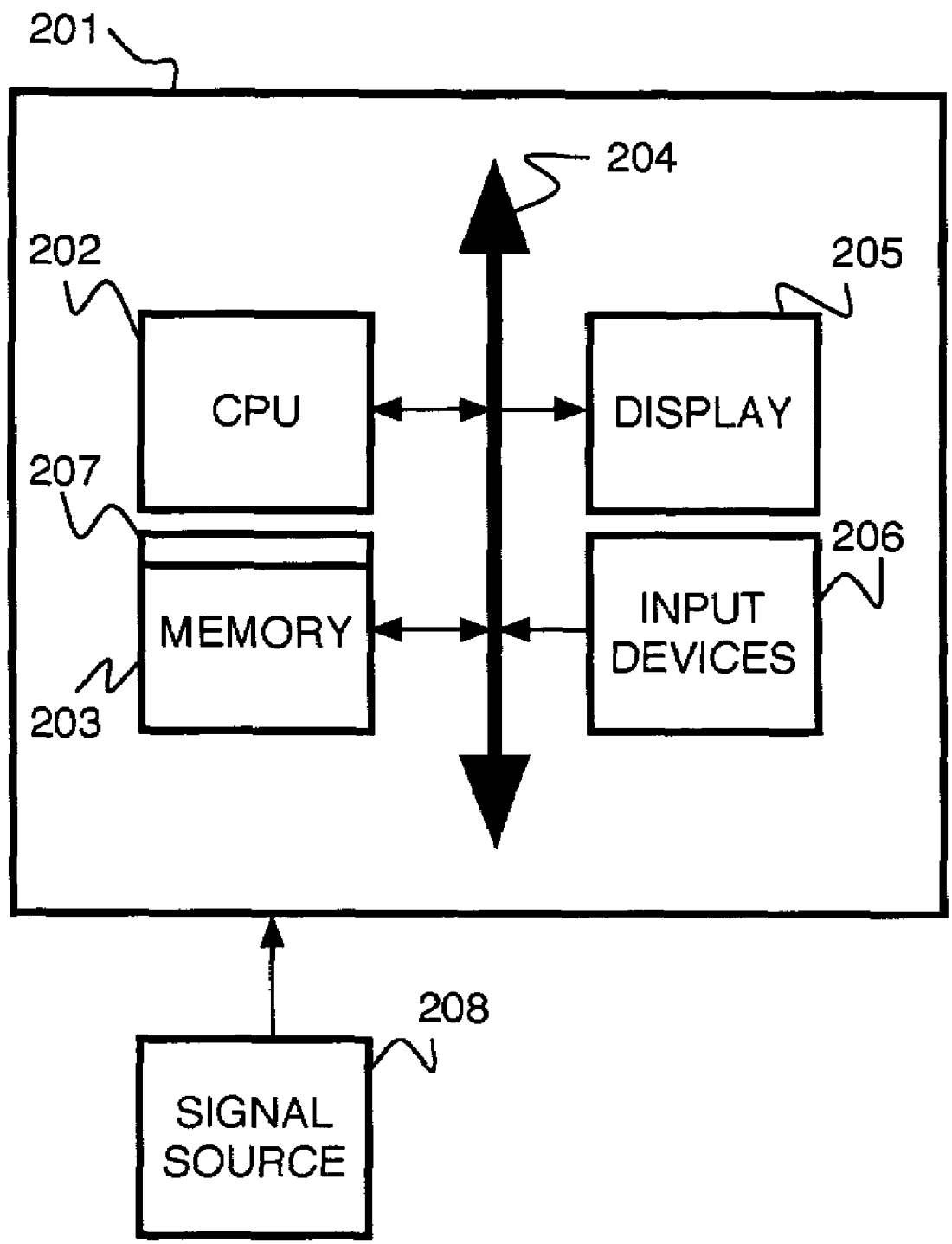
FIG. 2 is an illustration of a system according to an embodiment of the present invention.

Referring to FIG. 2, according to an embodiment of the present invention, a computer system 201 for implementing the present invention can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, a system and method for checking the compliance of analysis and design models can be implemented as an AddIn to a modeling application/environment such as Rational Rose. All interactions between the modeling environment and the AddIn are through an exposed interface that is registered with the modeling environment. The interface is contained in a connection class of the AddIn.

Figure 3:
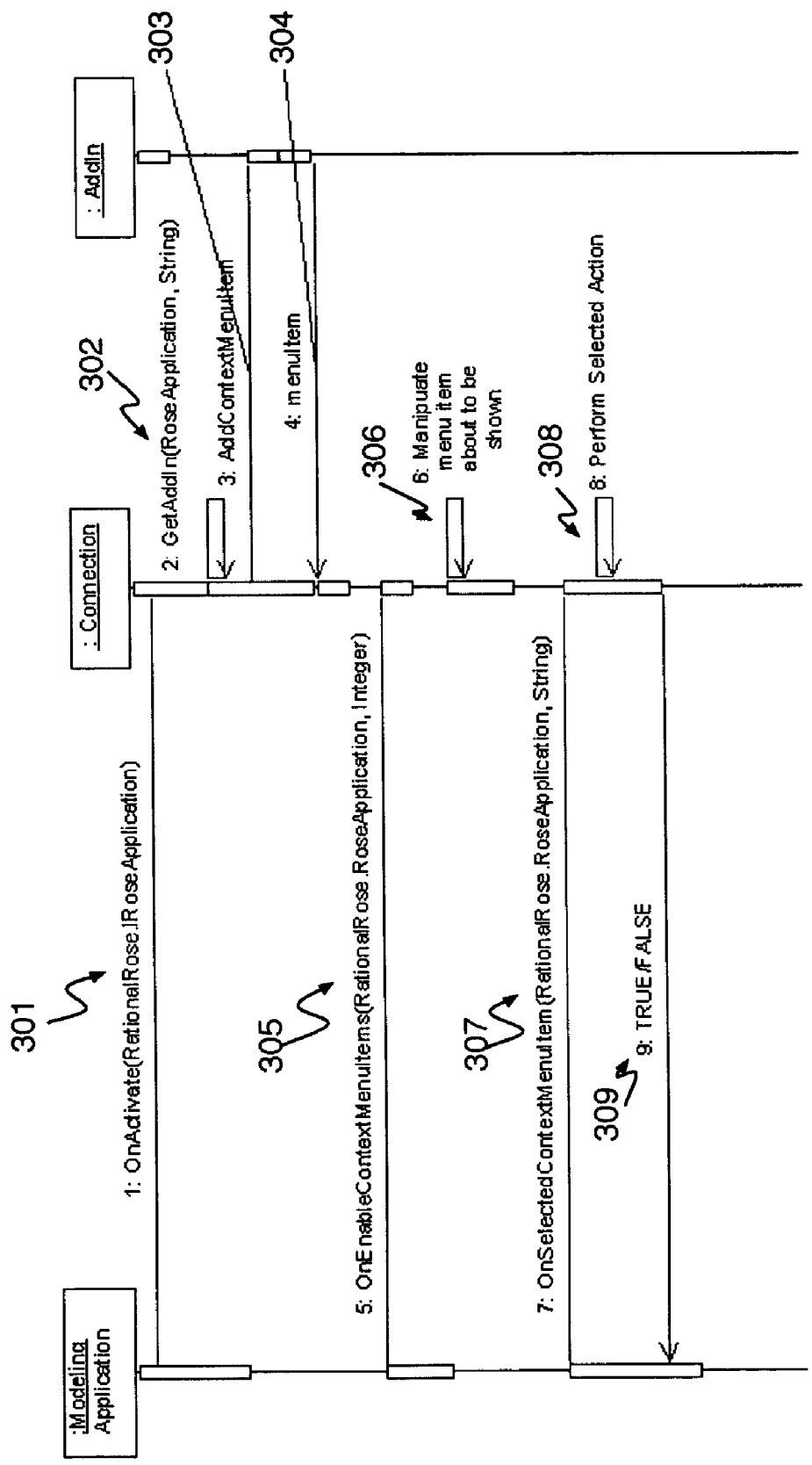
FIG. 3 is a flow chart of a method for starting a compliance addin from a modeling application according to an embodiment of the present invention.

For implementing the AddIn, an instanced object of the connection class is registered with the modeling environment, for example, using the windows registry. Referring to FIG. 3, a connection object OnActivate method is called by the modeling application 301, retrieving the AddIn component 302. The OnActivate method registers AddIn pop up menus with model artifacts 303, such that if an item in the modeling application is selected, for example, by a mouse click, the appropriate AddIn pop-up menu is activated 304. Once an AddIn pop-up menu is activated, but before it is displayed, an OnEnableContextMenuItem method is invoked 305. At this point, given the context of the artifact, the diagram, etc., items on the pop-up menu can be inactivated, activated, or checked 306. Once the menu is viewed and an item in the menu is selected by the user, the OnSelectedContextMenuItem method is called by the modeling application 307, and the AddIn can take the appropriate action 308 and return a value to the modeling application 309.

There are various possible starting points for checking for errors in a modeling application such as the Rose Browser. For example, an artifact or software component can be selected from the browser, a diagram, or a list box provided by the AddIn. Any artifact can be checked. If a package of artifacts is selected, the entire contents of the package will be checked, including any diagrams and/or state machines contained therein. Because of the difficulty of finding diagrams in the browser window in a large model, the AddIn can list sets of diagrams to check, for example, in a file tree.

The AddIn supports different types of rule and metric checks, including, for example, artifact rules and metrics, diagram rules, intra-model rules, and inter-model rules. Artifact rules and metrics are rules associated with a single UML artifact, such as a use case, class, association, etc. Rules and metrics can be selectively turned on/off, and the user can set the severity. Diagram rules are associated with a specific type of diagram, either the diagram currently being viewed, or selected diagrams of the specified type or "all" types. Intra-model rules apply only to one type of model, for example, analysis or design models. Inter-model rules span models and need simultaneous inspection of more than one model; for example, consistency checks between the analysis and design models.

Figure 4A:
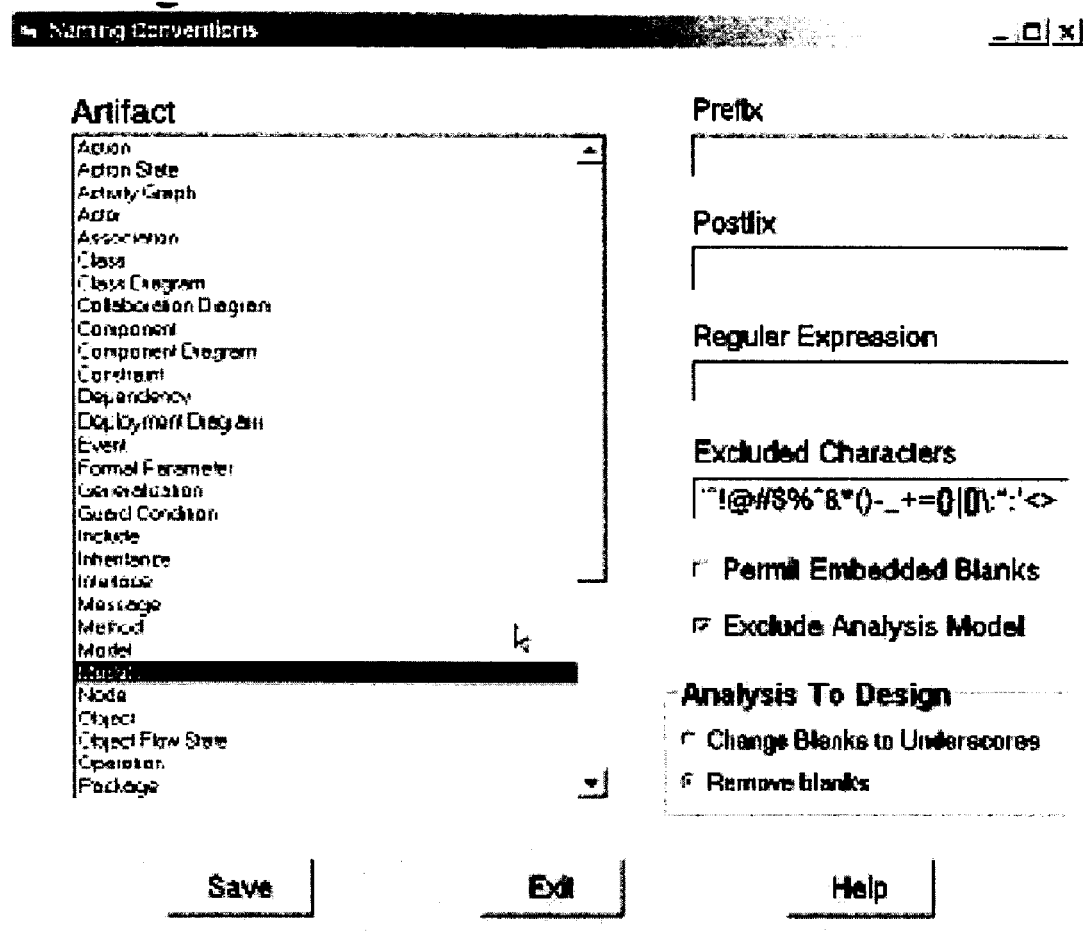
FIG. 4A is an illustration of a system for creating naming standards according to an embodiment of the present invention.

As shown in FIG. 4A, it is possible to create and enforce naming standards by defining naming conventions interactively. These conventions can include, for example, specifying the treatment of blank spaces, prefixes, postfixes, and excluded characters.

Metrics facilities are provided for generating summary and detailed reports, as well as identifying items that exceed user specified limitations. FIG. 4B illustrates the Metrics collection interface. Scripts gather information on standard metrics and provide the results in reports. A combination of metrics and rule check results can then be used to determine the "goodness" of the model based on tunable weighted parameters.

According to an embodiment of the present invention, rule violations can be determined on an artifact, diagram, model, or intra-model basis. Analysts and designers can request quick status checks via the diagram/model check menu items. For comprehensive reports, a report menu can be used. Metric rules can be collected by project members performing quality assurance functions. Metric rules are similar to rules, except that metric rules have additional properties for low and high limits. The limits can be turned off, for example by setting them to −1. When the code for a metric rule checks an artifact with which it is associated, the metric uses the supplied high and low limits for reporting errors. Reports are generated and can be reviewed with project management to improve the development process.

Figure 5A:
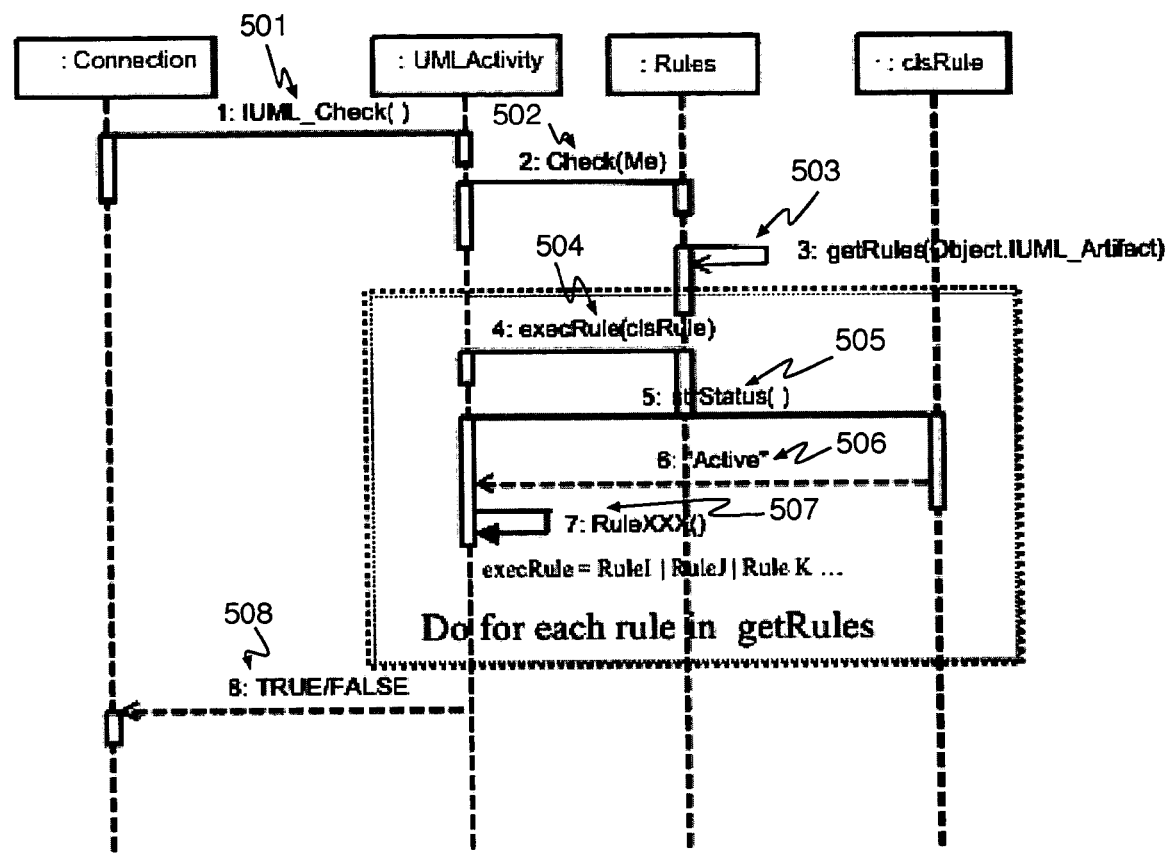
FIG. 5A is a flow chart of a method for triggering rules for an object according to an embodiment of the present invention.

FIG. 5 is a flow chart showing for triggering rules for an object. The object to be checked asks the Rules object to check it 501. The Rules object retrieves all rules associated with the object's artifact type (e.g., class, activity, scenario diagram) 502. Each rule object is tested to see if it is active (e.g., turned on) 503. If the rule is active, the execRule method of the object to be checked is called, using the rule object's rule number 504. The execRule method executes the object's Rule method 405; for example, if the argument was a 35, then Rule35( ) is called. The results are OR'ed, so that if any of the rule methods detect an error, the return from execRule will be TRUE 506. If an error is detected, a clsRuleError object is created, its log method is executed, and the clsRuleError object is added to the error collection of the object being checked 507. Thus, the object can record more than one error. The same process is then repeated for each metric 508.

By providing numerical values to each detected fault frequency, and by then combining the values to create aggregate scores, a gross estimate of the state of a model can be determined. For example, given 200 concrete leaf use cases, of which 100 have descriptive sets of sequence diagrams. Thus, it can be reported that the analysis model is about 50% complete or less. Similarly, given a rule that specifies that a class to be well-formed if the class comprises, for example, 10 or less methods not including derived methods, 10 or less attributes, and an inheritance depth of less than 5, it can be determined that since 30% of the model classes exceed one or more of these limits, then the well-formedness of the design model is 70%. Where at least 25% of the individual metrics indicators in a design model show below acceptable values, the implication is that the model will not pass a QA inspection, and may need corrective action by a Project Manager. One of ordinary skill in the art would appreciate that a measure of a level of completeness can be used by a Project Manager in conjunction with a timeframe for completing a project to determine what, if any, action is needed.

Figure 5B:
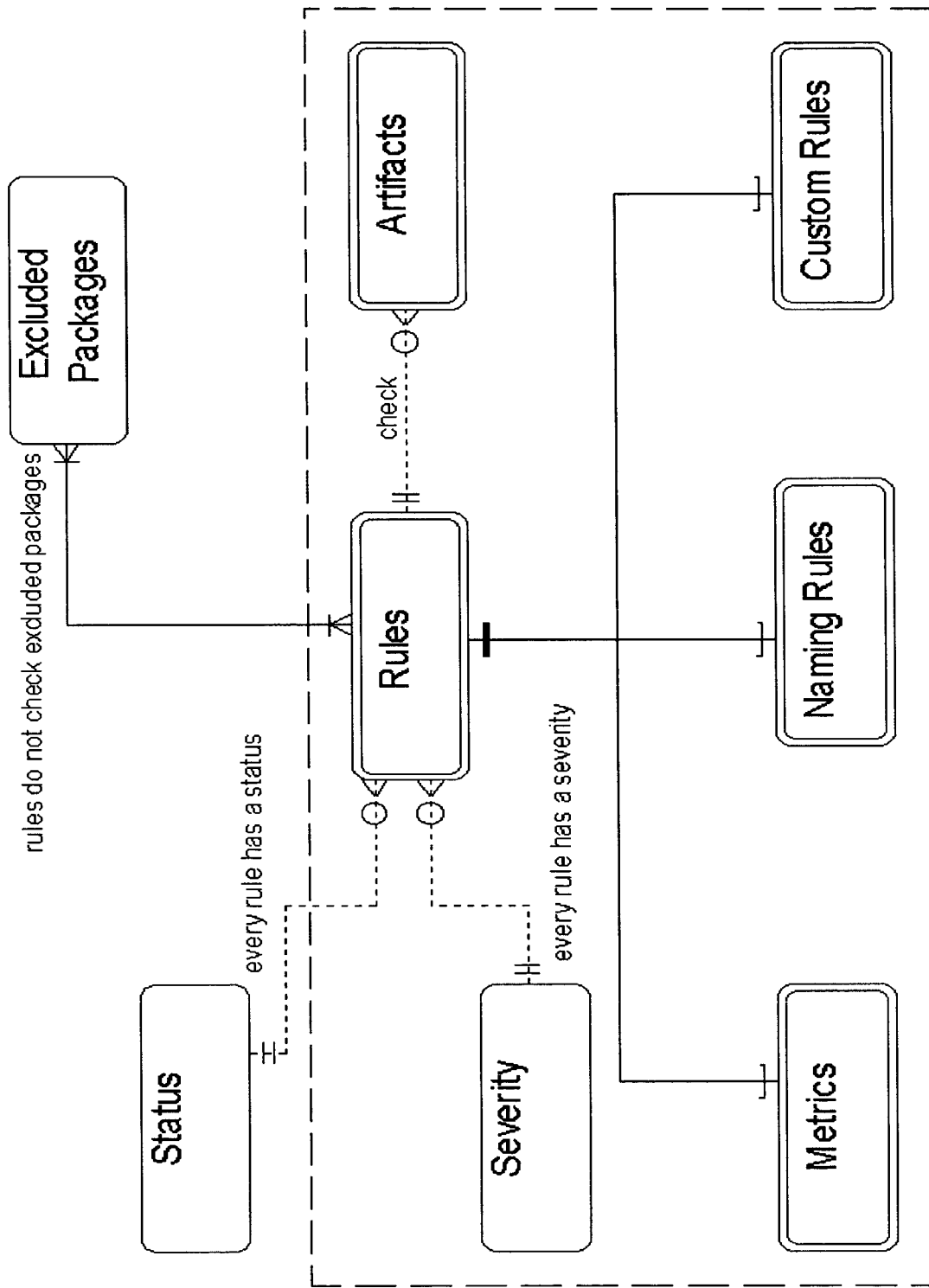
FIG. 5B is an illustration of a database according to an embodiment of the present invention.

An overview of the rules database can be seen in FIG. 5B. The database comprises rules, of which there are three types, regular rules, metrics, and custom rules. A database template exists in the same directory as the DesignAdvisor executable. Whenever a model is opened or created, if it does not already exist, a copy of the template database will be copied to the same directory as the model. This enables rules, severity, and naming conventions to be adjusted on a per model basis.

Figure 5C:
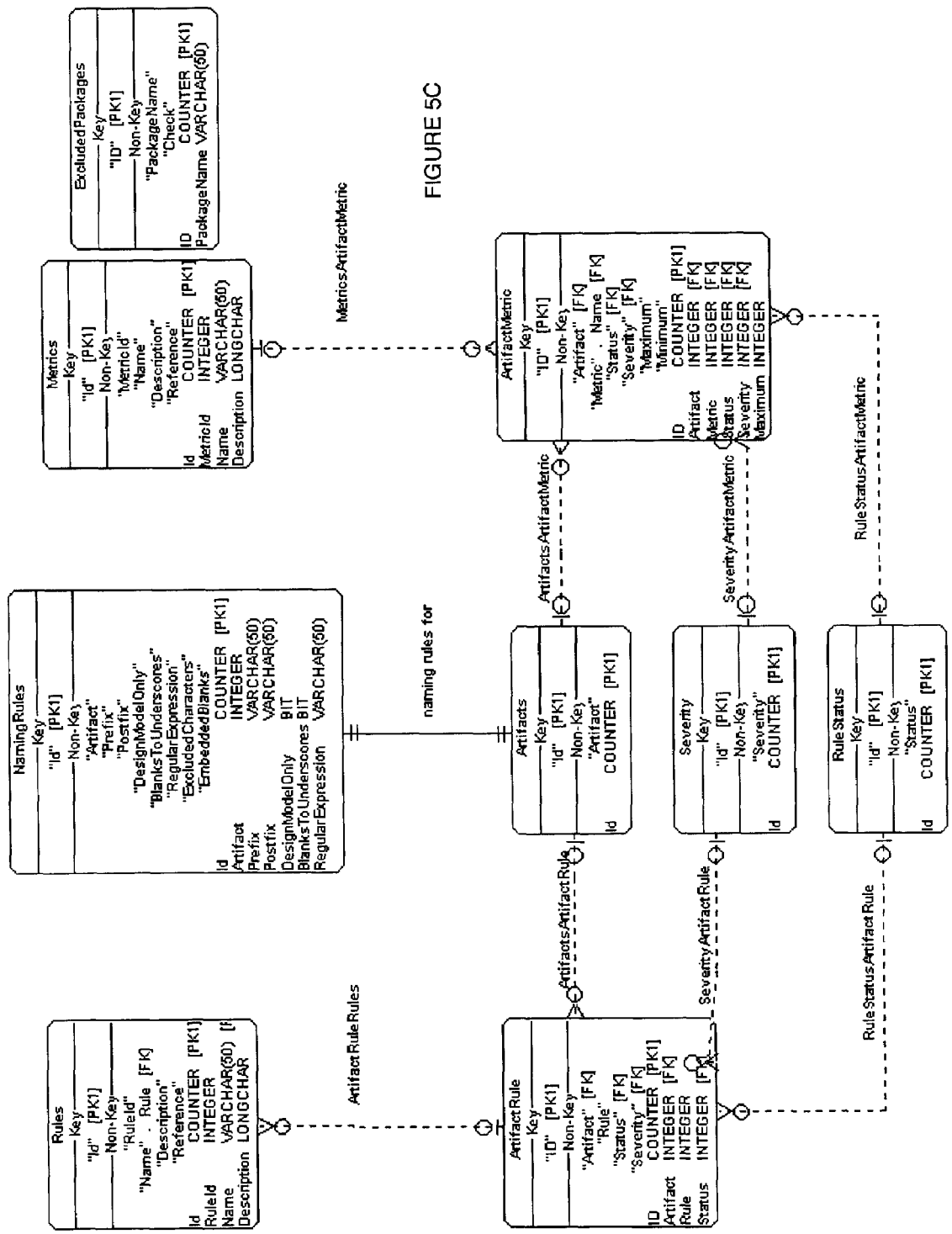
FIG. 5C is an illustration of a database schema according to an embodiment of the present invention.

The database structure can be seen in FIG. 5C. The ArtifactRule table is a resolution table, comprising a record that has a severity, status, artifact, and rule. Thus, one UML artifact can have more than one rule, each with its own status and severity. For example, a class might have a rule "missing description" with a status of "active" and a severity of "medium", and a rule "is used by other classes" with a status of "active" and a severity of "high". Note that severity and status can be adjusted on a per artifact-rule basis. Metric rules are identical to standard rules, except that, on a per artifact basis, there is a user-adjustable maximum and minimum associated with each artifact.

Referring to FIG. 6, it is possible to perform rule editing. For example, rules can be turned on or off and their severity can be changed. It is also possible for a user to extend the rule set by creating scripts in the VB or Java scripting language.

Figure 7:
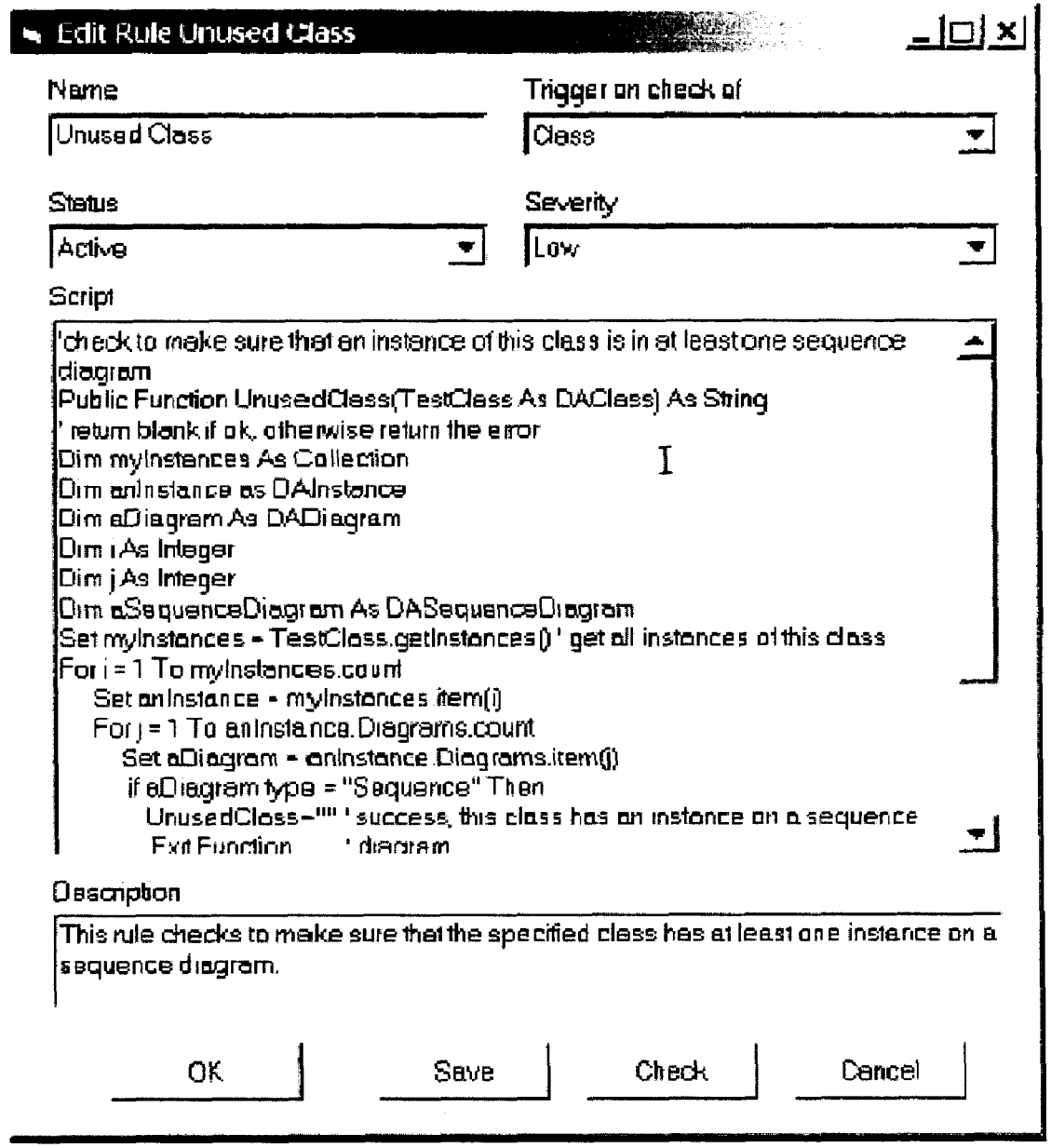
FIG. 7 is an illustration of a system for creating a custom script according to an embodiment of the present invention.

In the sample shown in FIG. 7, the collection of sequence diagrams is exposed, along with facilities for examining one of the sequence diagrams. Note that the facility is also provided to ask a class in the model to provide its current set of instances.

Figure 8:
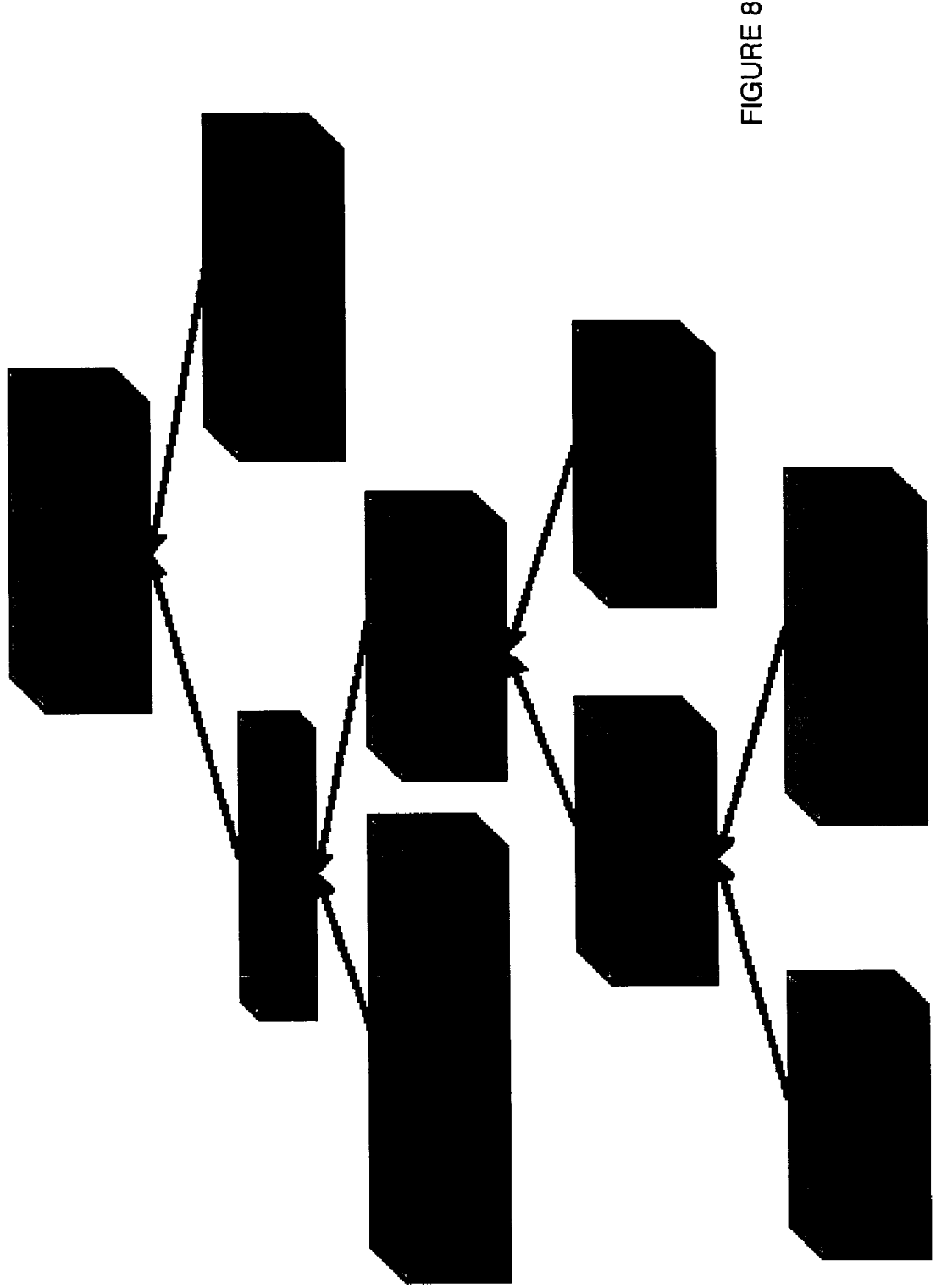
FIG. 8 is a flow chart of a method for estimating the quality of an architecture according to an embodiment of the present invention.

According to an embodiment of the present invention, a measure of goodness is determined for an architecture by using a function that generates a composite score, based on the results of the various rule, metrics and conventions that have been defined to the AddIn. An example determining the measure is shown in FIG. 8. Weighted scores are given to the rule evaluations, e.g., weighted score=rule weight*number of occurrences. The evaluations are normalized and a composite result for all the rules in a category is fed in to the next higher level of abstraction, resulting in a composite measure. The weights can be tuned individually, and the AddIn can display determinations.

During the management of a modeling effort, at any given point in time it is important to know what the status of an artifact is. Unfortunately, that capability is not built into modeling applications such as Rose.

Figure 9:
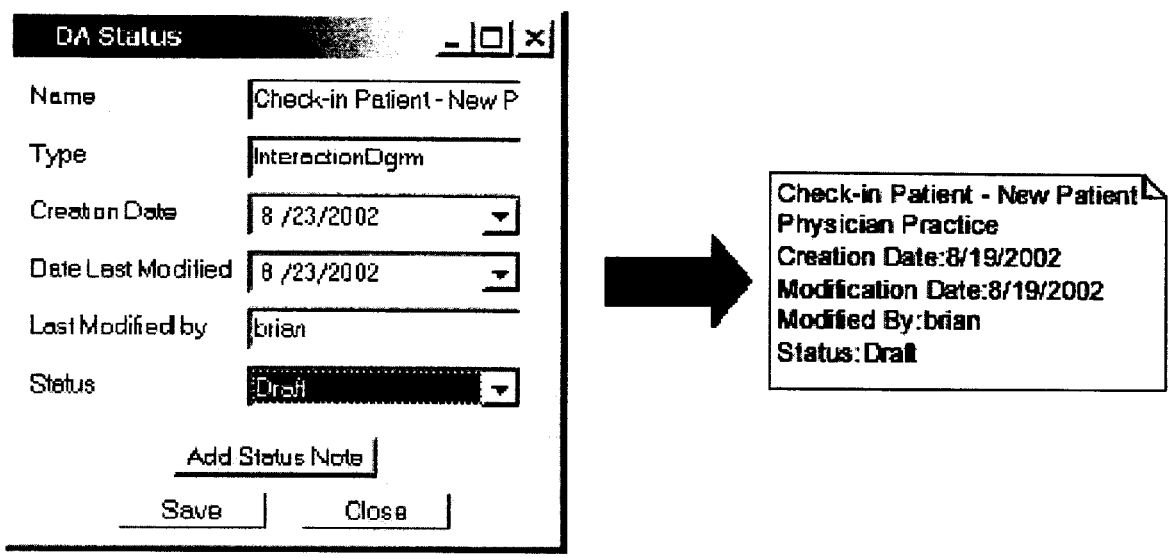
FIG. 9 is an illustration of a system for creating a status note on a diagram according to an embodiment of the present invention.

As shown in FIG. 9, an AddIn according to an embodiment of the present invention extends a modeling application to support artifact status, author, creation and last modified date at the artifact level including diagrams, classes, use cases, components, etc by right clicking on the object in the modeling application browser or on a diagram, and setting the artifact status. For diagrams, the AddIn includes the ability to "drop" a note on the diagram with status information. Changing the status of a diagram automatically updates the note.

A recurring problem during design is that of retaining the analysis model while being productive, there can be too many collaboration, sequence, class, state and activity diagrams to copy and modify. According to an embodiment of the present invention, these tasks are automated. Once a package is complete, it can be converted to a first cut design model by copying each diagram, converting analysis artifacts to design artifacts, changing the names per a user specified naming conventions, and creating a link between each design artifact and its corresponding analysis artifact. During the development effort, the AddIn can cross check the analysis model with the design model to insure that they remain synchronized, e.g., an analysis artifact not accounted for in the design, a design artifact not trace able back to an analysis artifact.

According to an embodiment of the present invention, the system and method can perform semantic, user configurable checks of model artifacts, including complex, cross-package, cross-diagram rule, and metric rules. The system accepts user-defined thresholds for Metric checks. Analysis and design models in the same modeling application database (.mdl file) can be manipulated, traced, and distinguished. Status, creation/modification dates of artifacts in the modeling application can be bookmarked. Reports can be cross-referenced, for example, classes and use cases and the diagrams where they appear. Evaluations for the analysis, design, and implementation models are determined. The system and method comprises a converter that takes an analysis model and creates a traceable first cut design model. Cross-model consistency checks are performed. An advisor can recommend modeling improvements. The system and method comprise an extensible rule set that can be edited and customized. Error reports are exported to XML documents. Reports are exported to a spreadsheet such as Excel. The system and method include facilities for export/import of rule set configuration on a per model basis to permit rule tailoring for different kinds of models. The system and method operate seamlessly with modeling applications such as Rational Rose™. The system and method include the ability to define 3rd party supplied packages (e.g. J2EE) to be ignored.

According to an embodiment of the present invention, the automated extraction of requirements and project tasks is enabled from a UML analysis model. A method by which detailed requirements and project tasks are extracted from a model comprises providing a use case model. An example of a use case model is shown 1001 in FIG. 10. The use case model is an acyclic directed graph, with dependencies (e.g., <<derived>> or <<d>>, <<extend>> or <<e>>, and <<include>> or <<i>>) as vertices and use cases as nodes. A set of trees of use cases is created, where each use case is a node in the tree with a <<derived>>, <<extend>> or <<include>> relationship with its parent. The extracted requirements tree set can then be imported directly into a requirements tool. An example of an extracted requirements tree is shown as 1004 in FIG. 10. Abstract use cases become features and sub features, concrete use cases become detailed requirements for which project tasks may be created, and test cases will be generated.

According to an embodiment of the present invention, a method for converting the directed graph to a set of trees comprises traversing a use case directed graph 1001 and 1002 in the model starting with root use cases as level 1. The method comprises creating a tree(s) 1003 and 1004 wherein each included, derived, or extending use case becomes a lower level node in the tree. A root use case is one that does not inherit or extend and is not included by other use cases. The method comprises converting the use case directed graph into one or more trees by looking at each node, and deleting relationships between a node and its predecessors until each node has one and only one parent.

Figure 10:
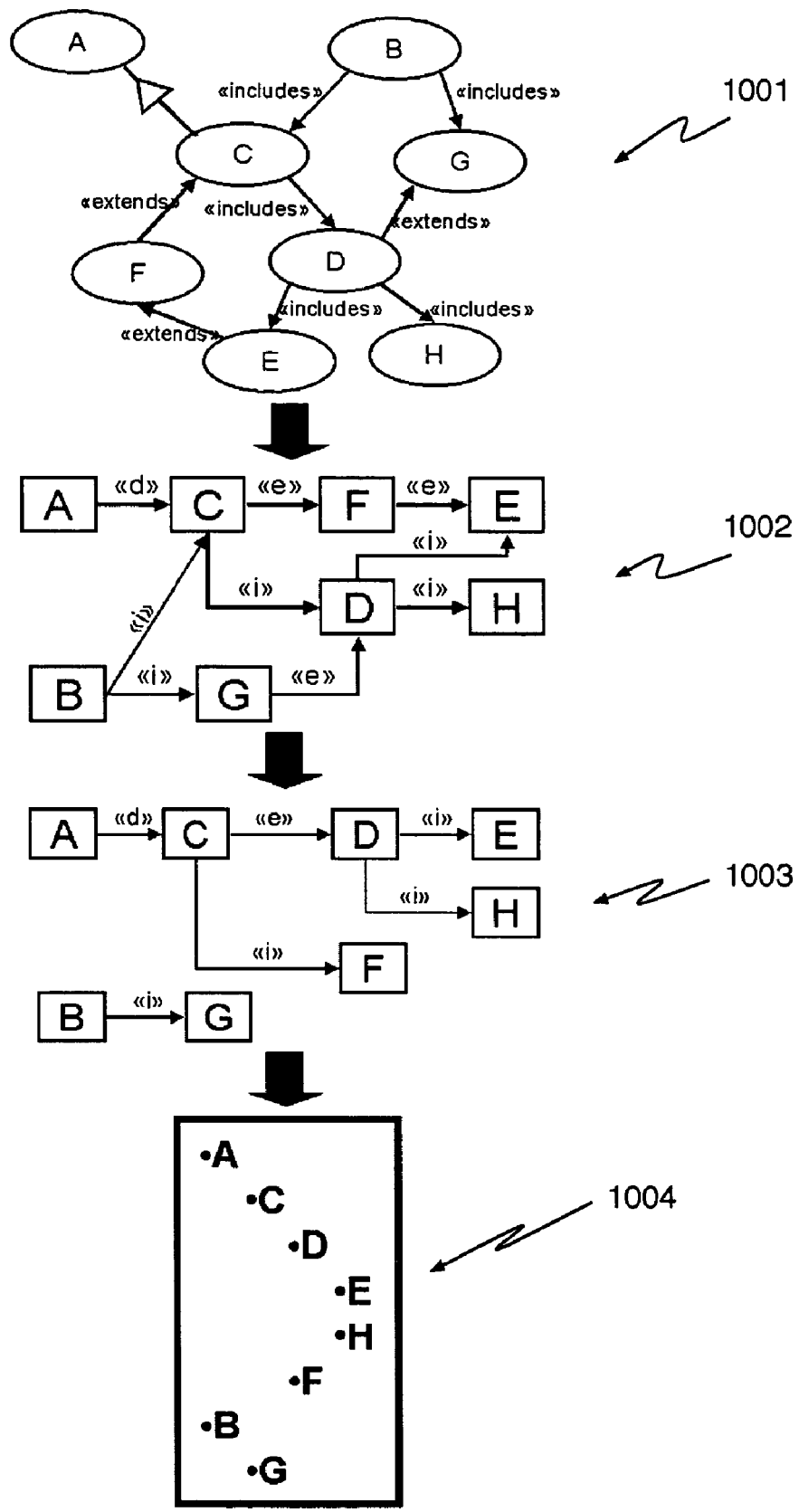
FIG. 10 is flow chart of a method for extracting requirements from an analysis model according to an embodiment of the present invention.

In FIG. 10, graphs 1001 and 1002 illustrate the same relationships in different styles. Similarly, graphs 1003 and 1004 illustrate the same relationships in different styles. Note that, when viewing a use case model as a directed graph, such as FIG. 10, the direction of a vertex with a stereotype of <<extends>> is the opposite of the drawn dependency (e.g. if "Schedule Item For Delivery"<<extends>> "Validate Item", the vertex direction is from "Validate Item" to "Schedule Item For Delivery"). Similarly, when creating a vertex to represent an inheritance relationship, the direction of the vertex is from the base use case to the derived use case.

Figure 11:
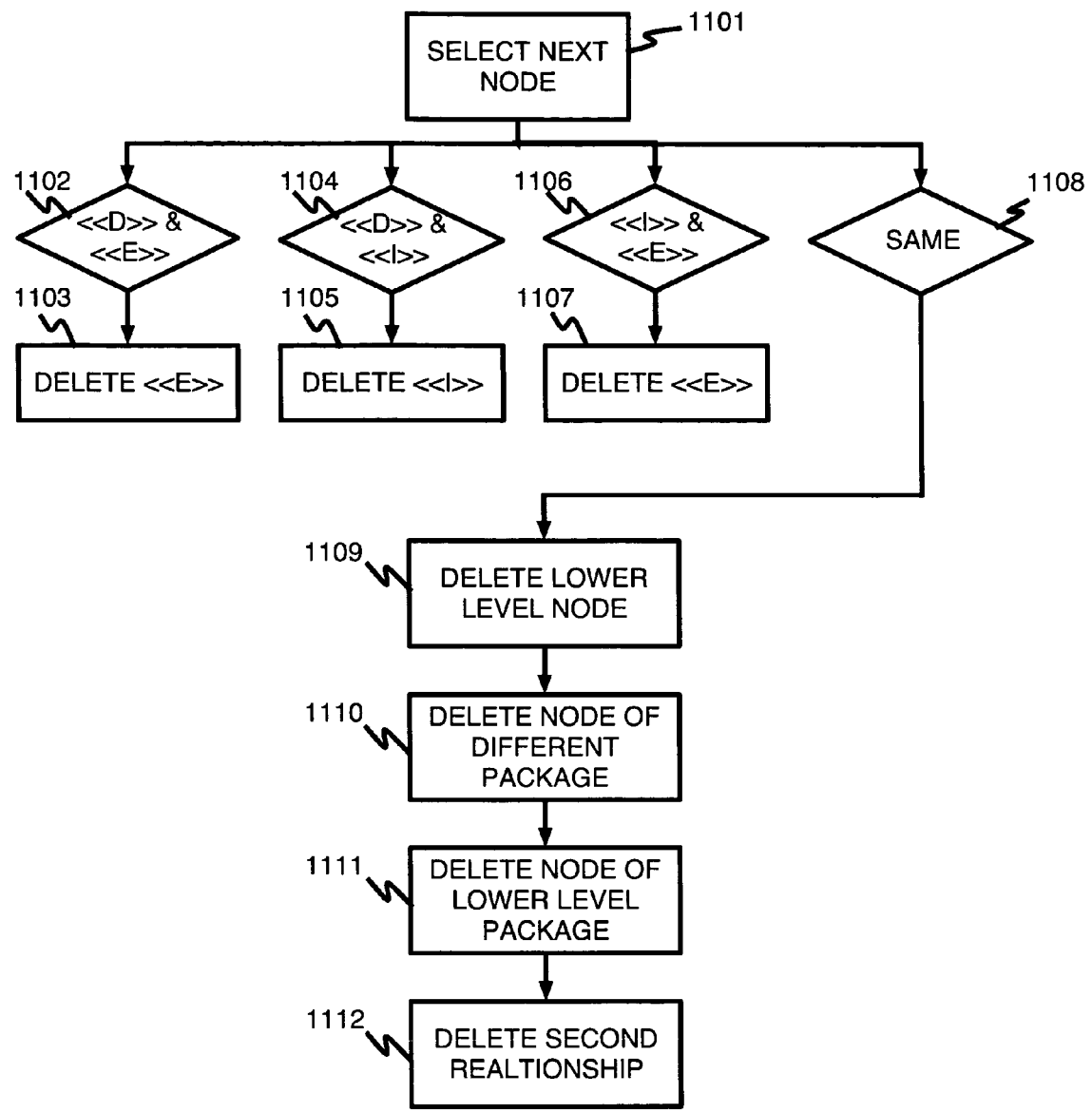
FIG. 11 is a flow chart of a method of converting a graph according to an embodiment of the present invention.

Referring to FIG. 11, given the relationships, the method selects a next node from a graph 1101 and performs the following conversions given a specified relationship: if a node has relationships to two predecessors one relation is <<derived>>, the other is <<extends>> 1102, delete the <<extends>> relation 1103; if a node has relationships to two predecessors one relation is <<derived>>, the other is <<includes>> 1004, delete the <<includes>> relation 1105; if a node has relationships to two predecessors one relation is <<includes>>, the other is <<extends>> 1106, delete the <<extends>> relation 1107; if a node has two predecessor relationships of the same type 1108, keep the relationship where the predecessor node is at a higher level (fewest vertices to travel back to root) 1109; if a node has two predecessor relationships of the same type 1108, keep the relationship where the predecessor node is in the same package as the child node 1110; if a node has two predecessor relationships of the same type 1108, keep the relationship where the predecessor node is in a higher level package 1109; and if a node has two predecessor relationships with all criteria the same, keep the first relationship encountered 1112.

Figure 12:
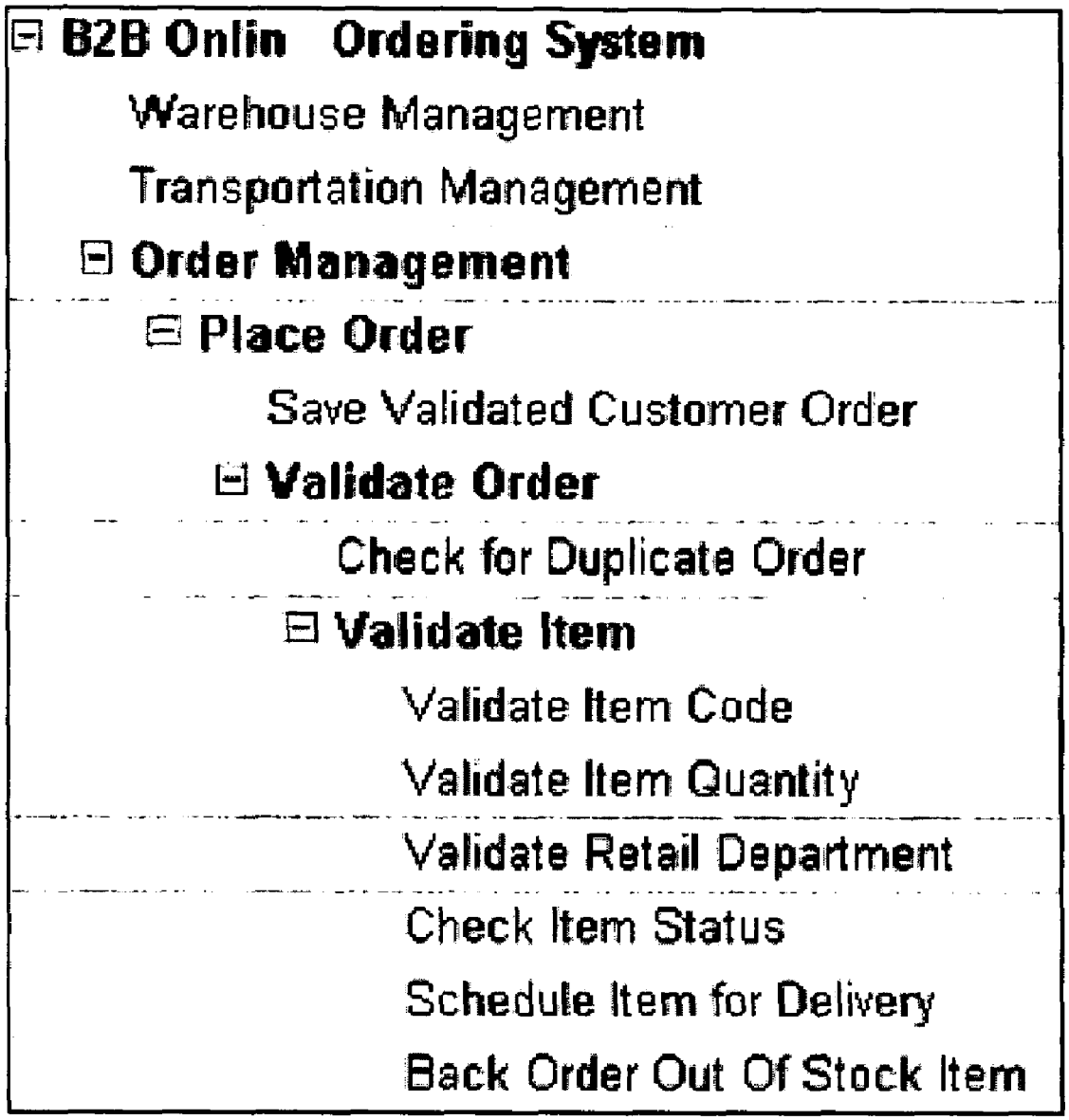
FIG. 12 is an illustration of extracted project tasks according to an embodiment of the present invention.

Applying the above method results in the extraction of a set of trees 1003 and 1004, where each tree root node is an abstract use case, and the remainder of the tree comprises nodes, each of which is an abstract or concrete use case at a specific level. FIG. 12 shows a sample fragment of project tasks automatically extracted from a model.

One potential problem is the presence of cycles in the model. If A includes B, B includes C, and C includes A, then the method may not work. However, use case model, which are directed graphs, that include cycles are semantically incorrect. According to an embodiment of the present invention, cycles are detected, wherein a request can be made to eliminate the cycles before proceeding with requirements extraction.

According to an embodiment of the present invention, a semiautomated conversion of an analysis model to a design model is achieved. When creating large, complex models, a user creates an analysis model to extract requirements, review the requirements, and then creates a design, usually in the same case tool. This would typically mean converting all the diagrams from analysis to design. But when this occurs, the analysis model is lost, and is replaced with the design model. According to an embodiment of the present invention an analysis model can be semiautomatically converted to the first draft of a UML Design Model.

The method comprises creating a mirror of the analysis organization (package structure) in a design view. Each diagram except Use case diagrams is reproduced with a slight name adornment to indicate that this is design instead of analysis. For example, diagram "Calculate insurance reimbursement" would become "Calculate insurance reimbursement—design". Each artifact is in the analysis model, including classes, objects, messages, class methods and attributes, states, activities, transitions, dependencies, associations, etc. is recreated in the design model using naming conversion rules, e.g. Class Customer Reimbursement might become class "cCustomerReimbursement". Further, each artifact on every diagram in the analysis model is recreated in the design model such that the analysis diagram and the design diagram are identical except that the analysis model labels are English, and the design model labels are software conformant, per the naming conversion rules. Hyperlinks are created such that it is very easy for the user trace back from design to analysis and to see the part of the analysis from which a particular part of the design was derived.

Referring to the automated analysis and design model verification according to an embodiment of the present invention, CASE tools in the past have provided some limited suite of verification checks on UML Models. According to an embodiment of the present invention, cross-model checks are performed, that is, checks that can only be performed across models. For example, the rule Unused Object works as follows: for a design model class trace to the analysis model class, object instances of the analysis model class are determined. Further, sequence and/or collaboration diagrams are checked to determine where instances of the class are used. If instances that send/receive messages are found then the class is used and passes. If, however, no instances can be found interacting with other objects on sequence or collaboration diagrams, then the object is unused and a rule violation is created.

Having described embodiments for a method checking the compliance of architectural analysis and design models, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer executed method for extracting requirements of an architectural software model comprising the steps of:

providing a use case model as a directed graph of the architectural software model comprising nodes corresponding to use cases and relations between nodes;

creating, automatically, a tree comprising a root node corresponding to an abstract use case and at least one leaf node corresponding to one of an abstract use case and a concrete use case;

importing the tree into a requirements tool;

extracting the requirements of the architectural software model from the tree, wherein the abstract use case corresponds to a feature of the architectural software model and the concrete use case corresponds to the requirements of the architectural software model; and determining a completeness of the requirements by triggering rules for objects of the architectural software model and determining whether the objects function according to the requirements.

2. The method of claim 1, wherein creating the tree comprises:

creating one of a feature and a sub-feature of the tree upon determining an abstract use case of the use case model; and creating a requirement of the tree upon determining a concrete use case of the use case model.

3. The method of claim 1, wherein creating the tree comprises:

traversing the directed graph beginning with a root use case of the directed graph; and creating one of an included relationship, a derived relationship, and an extended relationship use case node corresponding a next use case of the directed graph.

4. The method of claim 3, wherein the root use case does not inherit or extend and is not included by another use case.

5. The method of claim 3, further comprising deleting relationships between nodes until each node has one and only one parent.

6. The method of claim 5, further comprising:

deleting the extended relationship upon determining that the next node has relationships to two predecessors, wherein a first relationship is derived, a second relationship is extended;

deleting the included relationship upon determining that the next node has relationships to two predecessors, wherein the first relationship is derived, the second relationship is included; and deleting the extended relation upon determining that the next node has relationships to two predecessors, wherein the first relationship is included, the second relationship is extended.

7. The method of claim 5, further comprising:

deleting a relationship to a node of a lower level upon determining that the next node has two predecessor relationships of the same type;

deleting a relationship where a predecessor node is in a different package then a child node upon determining that the next node has two predecessor relationships of the same type; and deleting a relationship where the predecessor node is in a lower level package upon determining that the next node has two predecessor relationships of the same type.

8. The method of claim 5, further comprising deleting a later encountered relationship upon determining the next node has two predecessor relationships with the same criteria.

9. The method of claim 1, further comprising detecting a cycle in the directed graph.

10. The method of claim 9, further comprising requesting an elimination of the cycle before proceeding with requirements extraction.

11. A program storage device readable by machine, tangibly embodying a program of instructions executable by the machine to perform method steps for extracting requirements of an architectural software model, the method steps comprising:

providing a use case model as a directed graph of the architectural software model comprising nodes corresponding to use cases and relations between nodes;

creating, automatically, a tree comprising a root node corresponding to an abstract use case and at least one leaf node corresponding to one of an abstract use case and a concrete use case;

importing the tree into a requirements tool;

extracting the requirements of the architectural software model from the tree, wherein the abstract use case corresponds to a feature of the architectural software model and the concrete use case corresponds to the requirements of the architectural software model; and determining a completeness of the requirements by triggering rules for objects of the architectural software model and determining whether the objects function according to the requirements.

12. The method of claim 11, wherein creating the tree comprises:

creating one of a feature and a sub-feature of the tree upon determining an abstract use case of the use case model; and creating a requirement of the tree upon determining a concrete use case of the use case model.

13. The method of claim 11, wherein creating the tree comprises:

traversing the directed graph beginning with a root use case of the directed graph; and creating one of an included relationship, a derived relationship, and an extended relationship use case node corresponding a next use case of the directed graph.

14. The method of claim 13, further comprising deleting relationships between nodes until each node has one and only one parent.

15. The method of claim 11, further comprising detecting a cycle in the directed graph.

16. The method of claim 15, further comprising requesting an elimination of the cycle before proceeding with requirements extraction.

\* \* \* \* \*

UNITED STATES PATENT AND TRADEMARK OFFICE
CERTIFICATE OF CORRECTION

| | | |
|---|---|---|
| PATENT NO. | : 7,480,893 B2 | Page 1 of 1 |
| APPLICATION NO. | : 10/677406 | |
| DATED | : January 20, 2009 | |
| INVENTOR(S) | : Brian Berenbach and Jean Hartmann | |

It is certified that error appears in the above-identified patent and that said Letters Patent is hereby corrected as shown below:

Title page, item after the Title of the Invention: insert

--CROSS-REFERENCE TO RELATED APPLICATION

This application claims the benefit of Provisional Application 60/416,320, filed October 4, 2002.--

Signed and Sealed this

Twenty-fourth Day of March, 2009

JOHN DOLL
*Acting Director of the United States Patent and Trademark Office*